United States Patent [19]

Tamamushi

[11] 4,451,087

[45] May 29, 1984

[54] ANCHORING STRUCTURE FOR A SELF-STANDING SEAT BELT UNIT

[75] Inventor: Masahiro Tamamushi, Machida, Japan

[73] Assignee: Nissan Motor Co., Ltd., Yokohama, Japan

[21] Appl. No.: 283,687

[22] Filed: Jul. 15, 1981

[30] Foreign Application Priority Data

Aug. 15, 1980 [JP] Japan .......................... 55-116292[U]

[51] Int. Cl.³ ...................... A47D 15/00; B60R 21/00
[52] U.S. Cl. .................................... 297/468; 280/801; 403/117
[58] Field of Search ............... 297/468; 248/499, 505; 403/98, 116, 117; 280/801, 808

[56] References Cited

U.S. PATENT DOCUMENTS

| | | | |
|---|---|---|---|
| 1,189,770 | 7/1916 | Abbott | 403/117 |
| 3,022,096 | 2/1962 | Schwartz | 403/116 X |
| 3,842,687 | 10/1974 | Fansler | 403/116 X |
| 4,018,104 | 4/1977 | Bland et al. | 403/116 X |
| 4,199,190 | 4/1980 | Lindblad | 297/468 |
| 4,312,539 | 1/1982 | Takada | 297/468 |
| 4,372,613 | 2/1983 | Kitakami | 297/468 X |

FOREIGN PATENT DOCUMENTS

| | | |
|---|---|---|
| 2742668 | 3/1979 | Fed. Rep. of Germany . |
| 54-39769 | 11/1979 | Japan . |
| 502803 | 3/1939 | United Kingdom ................ 403/117 |
| 2021386 | 12/1979 | United Kingdom . |

Primary Examiner—James T. McCall
Attorney, Agent, or Firm—Schwartz, Jeffery, Schwaab, Mack, Blumenthal & Koch

[57] ABSTRACT

In accordance with the present invention, there is provided an improved anchoring structure for a self-standing seat belt unit adapted to be anchored to a side portion of a vehicle seat.

The anchoring structure comprises a support member which is mounted on the side portion of the vehicle seat and which is formed with an elongated opening. A guide member has a finger portion which projects toward the inside of the support member through the opening. The finger portion is movable within the opening and abuttingly engageable with the end walls of the opening to limit the extent of swinging movement of the self-standing seat belt unit.

6 Claims, 6 Drawing Figures

ANCHORING STRUCTURE FOR A SELF-STANDING SEAT BELT UNIT

BACKGROUND OF THE INVENTION

1. Field of the Invention

The present invention relates in general to safety harness or seat belt assemblies for use in vehicles such as automobiles or aircraft and more particularly to an anchoring structure for a self-standing seat belt unit adapted to be anchored to a side portion of a vehicle seat.

2. Description of the Prior Art

A known vehicular seat belt assembly consists of two interlockable seat belt units. The first seat belt unit preferably is a retractable type and adapted to be anchored on one side of a vehicle seat. The second seat belt is an unretractable type and adapted to be anchored on the other side of the vehicle seat. As shown in Japanese Utility Model Publication No. 54-39769, the second seat belt unit includes a self-supporting, elongated, upstanding member having at the upper end thereof a buckle to interlock with a latch plate provided to the first seat belt unit. The upstanding member is anchored at the lower end portion thereof to a side portion of the vehicle seat. The second seat belt unit is herein referred to as a self-standing seat belt unit, and the anchoring structure for the self-standing seat belt unit shown in the foregoing Japanese Utility Model Publication is shown in FIGS. 1 to 3.

Referring to the figures, the foregoing upstanding member is indicated at 15 and anchored to a side portion of a vehicle seat by means of a bolt 25. The upstanding member 15 is swingable about the axis of the bolt 25, and the swinging movement of the upstanding member is limited by a finger 21 which is movable together with the upstanding member and abuttingly engageable with projections 22b and 22c of a stopper member 22.

The upstanding member 15 is thus swingable within the limits for the purpose of enabling convenient access to and egress from the vehicle seat while at the same time retaining the upstanding member at a convenient position for use.

The prior art anchoring structure, however, has the following disadvantages. That is, the length L over which the finger 21 projects beyond the periphery of the stopper member 22 varies depending upon the dimensional errors of the through holes which are formed in the finger-containing member 19' and the stopper member 22 and through which the bolt 25 passes. The projecting amount L has an effect on the engagement between the finger 21 and the projections 22b and 22c. That is, if the projecting amount L is negative, the finger 21 cannot engage the projections 22b and 22c and will allow the buckle-containing upper end portion of the upstanding member 15 to fall to the floor and therefore cannot assuredly retain the upstanding member at a convenient position for use. On the other hand, if the projecting amount L is large enough for the assured engagement between the finger and the projections, the dangerous sharp edge of the finger can cause injury to a seat occupant's hand or leg.

The present invention contemplates solving such problems inherent in the prior art anchoring structure of the described type.

SUMMARY OF THE INVENTION

In accordance with the present invention, there is provided an improved anchoring structure for a self-standing seat belt unit adapted to be anchored to a side portion of a vehicle seat.

The self-standing seat belt unit includes a self-supporting, elongated, upstanding member and a belt connector mounted to the upper end of the upstanding member.

The anchoring structure of this invention comprises a support member mounted to the side portion of the vehicle seat, a bolt attaching the lower end portion of the upstanding member to the support member in such a manner that the upstanding member is swingingly movable about the axis of the bolt, and a guide member mounted on the lower end portion of the upstanding member to rotate together therewith about the axis of the bolt and having an integral finger portion projecting toward the support member, the support member having an elongated opening to receive therewithin the finger portion of the guide member in such a manner that the finger portion is movable within the opening and abuttingly engageable with the end walls of the opening to limit the extent of swinging movement of the upstanding member.

It is accordingly an object of the present invention to provide an improved anchoring structure for a self-standing seat belt unit adapted to be anchored to a side portion of a vehicle seat, which avoids the danger of injury to a seat occupant's hand or leg as well as assuredly retains the seat belt unit at a convenient position for use.

BRIEF DESCRIPTION OF THE DRAWINGS

The features and advantages of the anchoring structure according to the present invention will become more clearly appreciated from the following description taken in conjunction with the accompanying drawings, in which.

DESCRIPTION OF THE PREFERRED EMBODIMENT

Figure 1:
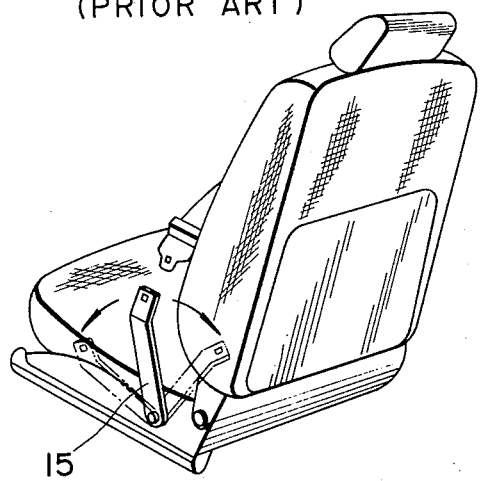
FIG. 1 is a perspective view of a prior art self-standing seat belt unit anchored to a side portion of a vehicle seat.
Figure 2:
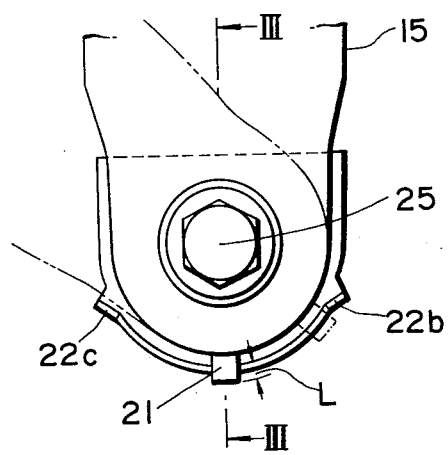
FIG. 2 is an elevational view of the anchoring structure of the seat belt unit of FIG. 1.
Figure 3:
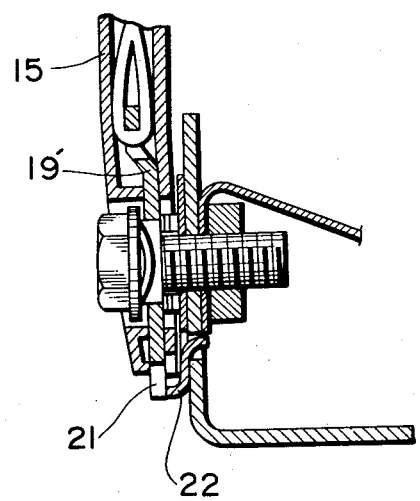
FIG. 3 is a cross sectional view taken along the line III—III of FIG. 2.
Figure 4:
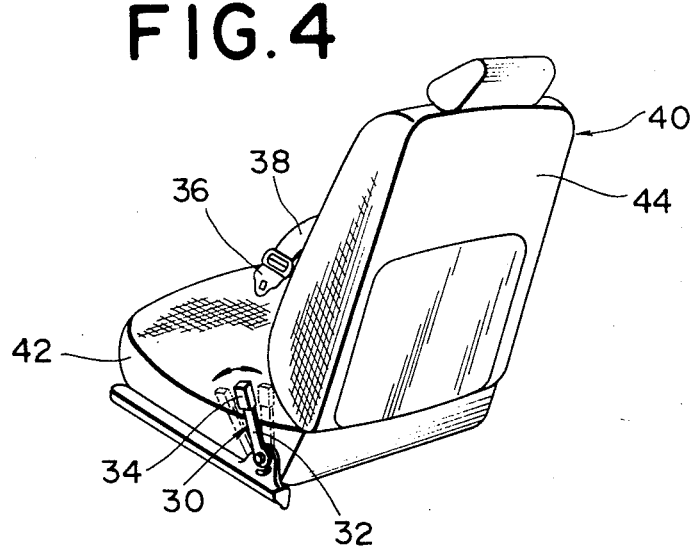
FIG. 4 is a perspective view of a self-standing seat belt unit which is anchored to a side portion of a vehicle seat by employing an anchoring structure according to the present invention.
Figure 5:
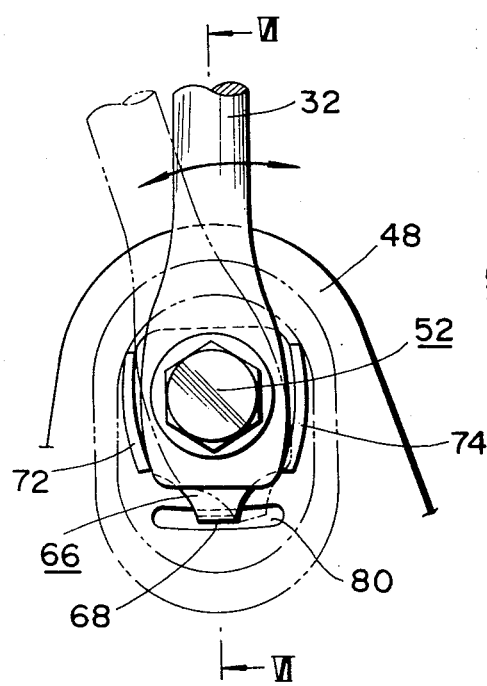
FIG. 5 is an elevational view of the anchoring structure embodying the present invention.
Figure 6:
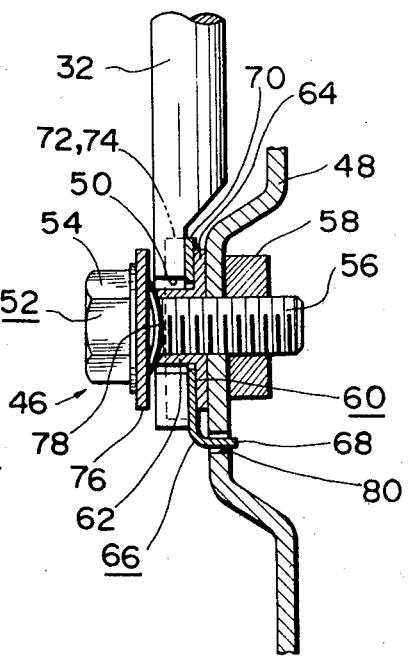
FIG. 6 is a sectional view taken along the line VI—VI of FIG. 5.

Referring to FIGS. 4 to 6, inclusive, a self-standing seat belt unit is generally indicated at 30 and includes an elongated upstanding member 32 having at the upper end thereof a belt connector 34 such as a buckle. The belt connector 34 interlocks, in use, with a second belt connector 36 such as a latch plate provided to the other seat belt unit 38. A vehicle seat 40 includes a seat cushion 42 and a seat back 44, and the upstanding member 32 is anchored at the lower end portion thereof to a side portion of the seat cushion 42. The upstanding member 32 is semi-rigid to be generally self-supporting and flexible under bending stress to conform to body curvature.

The anchoring structure for the self-standing seat belt unit 30 is generally indicated at 46 and comprises a rigid support member 48 which is mounted on the side portion of a seat cushion 42. The support member 48 has a generally vertically extending wall along the side surface of the seat cushion 42 and may preferably form part of the seat frame of the seat cushion. The lower end portion of the upstanding member 32 is formed with a hole 50 through which an attaching bolt 52 passes. The bolt 52 has a head portion 54 and a threaded stem portion 56 to receive a nut 58 which is positioned at the inside of the support member 48. A bushing member 60 has a sleeve portion 62 and a flange portion 64. The sleeve portion 62 is mounted on the bolt 52 and received within the hole 50 of the upstanding member 32. The flange portion 64 is interposed between the support member 48 and the lower end portion of the upstanding member 32. A guide member 66 is mounted on the lower end portion of the upstanding member 32 and includes a channel-like portion (no numeral) and a finger portion 68. The channel-like portion has a base wall 70 and a pair of side walls 72 and 74. The base wall 70 is formed with a hole (no numeral) to be substantially aligned with the hole 50 of the upstanding member 32 and to allow the sleeve portion 62 of the bushing member 60 to pass therethrough. The base wall is interposed between the flange portion 64 of the bushing member 60 and the lower end portion of the upstanding member 32. The side walls 72 and 74 are adapted to fittingly receive therebetween the lower end portion of the upstanding member 32. A rigid washer 56 is mounted on the bolt 76 at a location between the head portion 54 of the bolt and the lower end portion of the upstanding member 32, and a relatively thin elastic member or washer 78 is interposed between the washer 76 and the lower end portion of the upstanding member for urging the lower end portion of the upstanding member against the support member 48 for thereby retaining, by the effect of frictional resistance, the upstanding member at a convenient position for use.

The finger portion 68 of the guide member 66 is provided at the lower end of the channel-like portion and extends toward the support member 48. The support member is formed with an elongated opening 80 to receive therein the finger portion 68. The opening 80 is slightly arcuated to allow the finger portion 68 to be movable within the opening and abuttingly engageable with the end walls of the opening.

With the foregoing anchoring structure, the upstanding member 32 is swingable about the axis of the bolt 52, and the guide member 66 is mounted on the lower end portion of the upstanding member to rotate together therewith about the axis of the bolt. The swinging movement of the upstanding member 32 is limited by the finger portion 80 of the guide member 66 which is movable within the opening 80 and abuttingly engageable with the end walls of the opening. The head portion 54 of the bolt 52 cooperates with the nut 58 and the elastic member 78 to yieldingly or elastically clamp the lower end portion of the upstanding member 32 between the head portion 54 of the bolt 52 and the support member 48, enabling the upstanding member 32 to be retained at a convenient position for use. The upstanding member 32 is thus swingable within the limits in a manner enabling convenient access to and egress from the vehicle seat while at the same time retaining the upstanding member at a convenient position for use.

From the foregoing, it will be understood that the anchoring structure of the present invention presents no danger of injury to hand and leg and at the same time to retain the self-standing seat belt unit at a convenient position for use since the finger portion 68 of the guide member 68, extending toward the inside of the support member 48, can be long enough for the assured engagement with the end walls of the opening 80 without creating exposed dangerous sharp endges.

Obviously, many variations and modifications of the present invention are possible in light of the above teachings. It is, therefore, to be understood that within the scope of the apended claims, the invention may be practiced otherwise than as specifically described.

What is claimed is:

1. An anchoring structure for a self-standing seat belt unit adapted to be anchored to a side portion of a vehicle seat, said seat belt unit including a self-supporting, elongated upstanding member formed at the lower end portion thereof with a bolt accomodation hole and a belt connector mounted to the upper end of said upstanding member, said anchoring structure comprising:

a support member mounted to the side portion of said vehicle seat and having a bolt accommodation hole with which said bolt accomodation hole of said upstanding member is aligned;

a bushing member having a sleeve portion and a flange portion, said sleeve portion being received within said bolt accomodation hole of said upstanding member, said flange portion being interposed between said upstanding member and said support member;

a bolt passing through said bolt accomodation holes and said bushing sleeve portion and attaching the lower end of said upstanding member to said support member in such a manner that the upstanding member is swingingly movable about the axis of said bolt, said bolt having a head portion, a threaded stem portion and a nut at the end of said stem;

biasing means constituted by a relatively thin elastic member mounted on said bolt for urging the lower end portion of said upstanding member against said support member for thereby retaining, by the effect of frictional resistance, said upstanding member at a convenient position for use, said biasing means cooperating with said head portion of said bolt and said nut to elastically clamp the lower end portion of said upstanding member toward said support member; and a guide member of a thin-walled structure, mounted on the lower end portion of said upstanding member to rotate together therewith about the axis of said bolt and having a channel-like portion including a base wall and a pair of side walls, said base wall interposed between the lower end portion of said upstanding member and said flange portion of said bushing member and being formed with a hole which is substantially aligned with said bolt accomodation hole of said upstanding member and through which said sleeve portion of said bushing member passes, said side walls being adapted to fittingly receive between them the lower end portion of said upstanding member, said guide member further comprising an integral finger portion provided at the lower end of said base wall and projecting toward said support member;

said support member having an elongated opening to receive therewithin said finger portion in such a manner that the finger portion is movable within said opening and abuttingly engageable with the end walls of said opening to limit the extent of swinging movement of said upstanding member.

2. An anchoring structure as set forth in claim 1, wherein said opening in said support member is slightly arcuated.

3. An anchoring structure as set forth in claim 1, wherein said vehicle seat includes a seat cushion and a seat back and wherein said side portion of said vehicle seat is a side portion of the seat cushion.

4. An anchoring structure as set forth in claim 3, wherein said support member comprises a wall extending generally vertically along the side surface of said seat cushion.

5. An anchoring structure as set forth in claim 4, wherein said seat cushion comprises a substantially rigid seat frame, and wherein said support member forms part of said seat frame.

6. An anchoring structure as set forth in claim 1, wherein said upstanding member is semi-rigid to be generally self-supporting and flexible under bending stress to conform to body curvature.

* * * * *